United States Patent
Esteghlal

(10) Patent No.: US 12,334,803 B2
(45) Date of Patent: Jun. 17, 2025

(54) CONTROL DEVICE FOR A DC-DC VOLTAGE CONVERTER WITH A VOLTAGE CONTROLLER, DC CONVERTER AND METHOD FOR CONTROLLING A DC CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 17/639,058

(22) PCT Filed: Aug. 10, 2020

(86) PCT No.: PCT/EP2020/072392
§ 371 (c)(1),
(2) Date: Feb. 28, 2022

(87) PCT Pub. No.: WO2021/037544
PCT Pub. Date: Mar. 4, 2021

(65) Prior Publication Data
US 2022/0329145 A1 Oct. 13, 2022

(30) Foreign Application Priority Data
Aug. 30, 2019 (DE) .................... 10 2019 213 076.3

(51) Int. Cl.
*H02M 1/00* (2007.01)
*H02M 3/158* (2006.01)

(52) U.S. Cl.
CPC ....... *H02M 1/0022* (2021.05); *H02M 1/0025* (2021.05); *H02M 3/1584* (2013.01)

(58) Field of Classification Search
CPC . H02M 3/1584; H02M 1/0022; H02M 1/0025
See application file for complete search history.

(56) References Cited

U.S. PATENT DOCUMENTS 3,805,142 A    4/1974   Rando
5,880,947 A *   3/1999   Imanaka ............... H02M 7/219
                                                 363/127

(Continued)

FOREIGN PATENT DOCUMENTS

| CN | 104081613 A | 10/2014 |
|---|---|---|
| DE | 102016215147 A1 | 2/2018 |
| DE | 102016219740 A1 | 4/2018 |

OTHER PUBLICATIONS

Translation of International Search Report for Application No. PCT/EP2020/072392 dated Nov. 5, 2020 (2 pages).

*Primary Examiner* — Gustavo A Rosario-Benitez
(74) *Attorney, Agent, or Firm* — Michael Best & Friedrich LLP

(57) ABSTRACT

The present invention relates to a control of a DC converter (10) comprising a plurality of DC converter modules (4-1, 4-2). For this purpose, a central control variable is generated for all DC converter modules for a voltage-controlled control of the DC converter. Moreover, a current-based control variable can additionally be generated for each DC converter module. The output power, in particular the output current of each DC converter module can be individually adjusted by combining the voltage-based control variable and the current-based control variable. An overload of the DC converter modules can thus be prevented.

12 Claims, 2 Drawing Sheets

(56) References Cited

U.S. PATENT DOCUMENTS

| | | | | |
|---|---|---|---|---|
| 6,285,571 B1* | 9/2001 | Brooks | ............... | H02M 3/1584 |
| | | | | 323/272 |
| 2002/0015319 A1* | 2/2002 | Hartular | .............. | H02M 3/1584 |
| | | | | 363/56.05 |
| 2003/0081438 A1* | 5/2003 | Dinh | ....................... | H02J 1/102 |
| | | | | 363/127 |
| 2006/0139015 A1* | 6/2006 | Dinh | .................. | H02M 3/1584 |
| | | | | 323/272 |
| 2018/0212457 A1* | 7/2018 | Haefele | ................ | H02M 3/285 |
| 2019/0181752 A1* | 6/2019 | Esteghlal | ................ | H02M 1/44 |
| 2020/0186026 A1* | 6/2020 | Esteghlal | ................ | H02M 3/04 |
| 2020/0259418 A1* | 8/2020 | Higaki | ................ | H02M 3/1584 |
| 2020/0373842 A1* | 11/2020 | Chen | ................... | H02M 7/483 |
| 2022/0029428 A1* | 1/2022 | Ino | .......................... | B60L 58/13 |

\* cited by examiner

CONTROL DEVICE FOR A DC-DC VOLTAGE CONVERTER WITH A VOLTAGE CONTROLLER, DC CONVERTER AND METHOD FOR CONTROLLING A DC CONVERTER

FIELD

The present invention relates to a control device for a DC-DC voltage converter, in particular a DC-DC voltage converter comprising a plurality of DC-DC voltage converter modules, to a DC-DC voltage converter comprising such a control device and to a method for controlling a DC-DC voltage converter.

BACKGROUND OF THE INVENTION

DE 10 2016 219 740 A1 discloses a DC-DC voltage converter comprising a plurality of DC-DC voltage converter modules connected in parallel. In this case, a common voltage controller is provided for all of the DC-DC voltage converter modules. Furthermore, a separate current controller is provided for each DC-DC voltage converter module.

DC-DC voltage converters are provided to convert a DC input voltage to a DC output voltage, wherein the voltage level of the DC input voltage may be different from the voltage level of the DC output voltage. The maximum output power of a DC-DC voltage converter is limited in accordance with the dimensioning of the components used. In order to increase the output power, a plurality of DC-DC voltage converter modules can be connected in parallel where necessary.

SUMMARY OF THE INVENTION

The present invention discloses a control device for a DC-DC voltage converter, a DC-DC voltage converter and a method for controlling a DC-DC voltage converter.

Accordingly, the following is provided:

A control device for a DC-DC voltage converter comprising a plurality of DC-DC voltage converter modules. The control device comprises a feedforward control device and a plurality of current controllers. In particular, each DC-DC voltage converter module of the DC-DC voltage converter is assigned a separate current controller. The feedforward control device is designed to generate a first controlled variable. In particular, the feedforward control device can generate the first controlled variable using a setpoint value for the output voltage of the DC-DC voltage converter and a determined value of the input voltage of the DC-DC voltage converter. The plurality of current controllers are each designed to generate an individual second controlled variable for the respectively assigned DC-DC voltage converter module. Each current controller is respectively designed to determine the respective controlled variable using a determined value for the current in the respectively assigned DC-DC voltage converter module and a predetermined maximum current for the respective DC-DC voltage converter module. The control device for the DC-DC voltage converter is furthermore designed to provide a respective combination of the first controlled variable and the second controlled variable for the respectively assigned DC-DC voltage converter module to the DC-DC voltage converter module.

The following is also provided:

A DC-DC voltage converter comprising a plurality of DC-DC voltage converter modules and a control device according to the invention for the DC-DC voltage converter. Each of the DC-DC voltage converter modules is designed to convert a DC input voltage to a DC output voltage. Furthermore, a separate current controller is provided in the control device for each DC-DC voltage converter module in the DC-DC voltage converter.

Finally, the following is provided:

A method for controlling a DC-DC voltage converter comprising a plurality of DC-DC voltage converter modules. The method comprises a step for generating a first controlled variable using a setpoint value for the output voltage of the DC-DC voltage converter and a determined value of the input voltage of the DC-DC voltage converter. The method furthermore comprises a step for generating a plurality of individual second controlled variables, wherein a separate second controlled variable is generated for each DC-DC voltage converter module of the DC-DC voltage converter. The respective second controlled variable is generated in particular using a determined value for the current of the respectively assigned DC-DC voltage converter module and a predetermined maximum current for the respective DC-DC voltage converter module. Finally, the method comprises a step for combining the first controlled variable and the second controlled variable for the respectively assigned DC-DC voltage converter module and for providing the respective combined controlled variable to the corresponding DC-DC voltage converter module.

The present invention is based on the knowledge that a DC-DC voltage converter can generally provide only a limited maximum output power. If a plurality of individual DC-DC voltage converter modules are connected in parallel in a DC-DC voltage converter, in this case the output power of each individual DC-DC voltage converter module is limited. Overloading of the DC-DC voltage converter, in particular of a DC-DC voltage converter module, can lead to damage to the corresponding DC-DC voltage converter module.

It is therefore an idea of the present invention to take this knowledge into consideration and to limit the maximum output current of the individual DC-DC voltage converter modules in a DC-DC voltage converter comprising a plurality of DC-DC voltage converter modules. In this way, even given a high power demand at the output side of the DC-DC voltage converter, the power output of the DC-DC voltage converter, in particular of each individual DC-DC voltage converter module of a DC-DC voltage converter comprising a plurality of DC-DC voltage converter modules connected in parallel, can be limited to a permissible extent. In this way, damage to the individual DC-DC voltage converter modules caused by overloading can be prevented.

To this end, provision is made on the one hand to control the output voltage of the DC-DC voltage converter comprising a plurality of DC-DC voltage converter modules connected in parallel centrally by way of a common feedforward device. Furthermore, for the purpose of limiting the power of the individual DC-DC voltage converter modules, a separate current controller is provided for each DC-DC voltage converter module of the DC-DC voltage converter. The power output can be adjusted individually by limiting the maximum output current of the respective DC-DC voltage converter modules by means of the individual current controllers for the plurality of DC-DC voltage converter modules of a DC-DC voltage converter. In this case, the generated controlled variables of the feedforward device for the respective DC-DC voltage converter module are reduced by the controlled variable of the current controller.

In this way, it is possible that the central feedforward device first generates a first controlled variable. The individual DC-DC voltage converter modules can be actuated based on said first controlled variable in such a way that a setpoint voltage that is to be achieved is provided at the outputs of the respective DC-DC voltage converter modules. However, if a power demand that would lead to an impermissibly high output current at a DC-DC voltage converter module of the DC-DC voltage converter were to arise in this case at the output of the DC-DC voltage converter based on the configuration at the desired setpoint voltage, the first controlled variable from the central feedforward control device can be superposed by the individual second controlled variable from the current controller by way of the control by means of the respective assigned current controller of the corresponding DC-DC voltage converter module. In this way, the output power of the respective DC-DC voltage converter module is limited in such a way that a maximum output current at the respective DC-DC voltage converter module is not exceeded.

This power or current limitation of the individual DC-DC voltage converter modules can be illustrated using the example of a capacitor at the output of the DC-DC voltage converter. If the DC-DC voltage converter comprising the plurality of DC-DC voltage converter modules were to provide the controlled variable required to achieve the output voltage at the beginning of the charging process of a capacitor, a very high charging current for the capacitor would arise at the beginning of this charging process. This high charging current could overload one or more of the DC-DC voltage converter modules. Therefore, the controlled variable for the feedforward control device is superposed by a suitable initialization of the respective current controllers for the individual DC-DC voltage converter modules in order to limit the maximum output current of the individual DC-DC voltage converter modules to a maximum current value. In this case, during the charging process, a lower output voltage will first result at the output of the DC-DC voltage converter. As the charging process continues, the voltage at the output of the DC-DC voltage converter and thus across the capacitor increases, while the capacitor is charged with the maximum currents of the individual DC-DC voltage converter modules. If the voltage across the capacitor approaches the target value, the charging currents decrease in this case. In this process, the limitation of the electric currents in the DC-DC voltage converter modules is offset by the respective current controllers. In other words, the second controlled variables of the current controllers for the DC-DC voltage converter modules tend to zero and the first controlled variable from the feedforward control device is applied to the DC-DC voltage converter modules without further superposition of the second controlled variables for current limitation.

In accordance with one embodiment, the control device comprises a voltage controller. The voltage controller can be designed to generate a third controlled variable using a setpoint value for the output voltage of the DC-DC voltage converter and a determined value of the output voltage of the DC-DC voltage converter. In this way, the present output voltage can also be taken into account for the control of the DC-DC voltage converter.

In accordance with one embodiment, the voltage controller comprises a two-point controller. By way of example, the voltage controller may be an I controller, that is to say a controller with a purely integrative control behavior without a P component or the like. The voltage controller can be operated for example at two operating points. At a first operating point, the voltage controller can output a third controlled variable, which is suitable for permitting a flow of current into the DC-DC voltage converter modules if the output voltage of the DC-DC voltage converter falls below a prescribed first threshold value. At a second operating point, the voltage controller can output a third controlled variable, which is suitable for deactivating a flow of current into the DC-DC voltage converter modules if the output voltage of the DC-DC voltage converter exceeds a prescribed second threshold value. To this end, for example, the value of the third controlled variable can be reduced to the extent that the DC-DC voltage converter modules subsequently do not output an electric current. In particular, the voltage controller can be operated at the first operating point if or provided that the output voltage of the DC-DC voltage converter is below a prescribed threshold value. That is to say that the third controlled variable output by the voltage controller permits a flow of current in the DC-DC voltage converter modules until the prescribed threshold value is reached at the output of the DC-DC voltage converter. If the output voltage of the DC-DC voltage converter exceeds the prescribed threshold value, the voltage controller can change to the second operating point. The third controlled variable of the voltage controller is subsequently decreased to the extent that it does not bring about a flow of current in the DC-DC voltage converter modules. If the voltage at the output of the DC-DC voltage converter continues to decrease below a further threshold value, the voltage controller can subsequently pass back to the first operating point. The further threshold value lies below the previously indicated threshold value by a hysteresis or an offset. As a result, an approximately constant voltage can be maintained at the output of the DC-DC voltage converter in a simple manner.

In accordance with one embodiment, the individual current controllers for the respectively assigned DC-DC voltage controller modules are each designed to limit an output current of the assigned DC-DC voltage converter modules to a predetermined maximum current. In this way, overloading of the respective DC-DC voltage converter modules can be prevented. In particular, given an identical or similar configuration of the DC-DC voltage converter modules, the current controllers can limit the output current of the DC-DC voltage converter modules to a common maximum current. As an alternative, it is also possible to employ DC-DC voltage converter modules of a different or varied configuration in the DC-DC voltage converter. In this case, the individual current controllers can each use an individual maximum output current for limiting the maximum current in the respective DC-DC voltage converter module.

In accordance with one embodiment of the DC-DC voltage converter, the DC-DC voltage converter can be designed to be coupled at an output of the DC-DC voltage converter to a capacitor. In particular, the DC-DC voltage converter can be coupled for example to a link circuit capacitor of an electrical power converter, for example an inverter.

In accordance with one embodiment, the control device is designed to deactivate the current controllers when a predetermined output voltage is reached at the output of the DC-DC voltage converter.

The above configurations and developments can be combined with one another as desired, insofar as is sensible. Further configurations, developments and implementations of the invention also include combinations which have not been explicitly mentioned of features of the invention described above or below in relation to the exemplary embodiments. In particular, a person skilled in the art will in this case also add individual aspects as improvements or additions to the respective basic forms of the invention.

BRIEF DESCRIPTION OF THE DRAWINGS

Further features and advantages of the invention are explained below with reference to the figures, in which.

DETAILED DESCRIPTION

Figure 1:
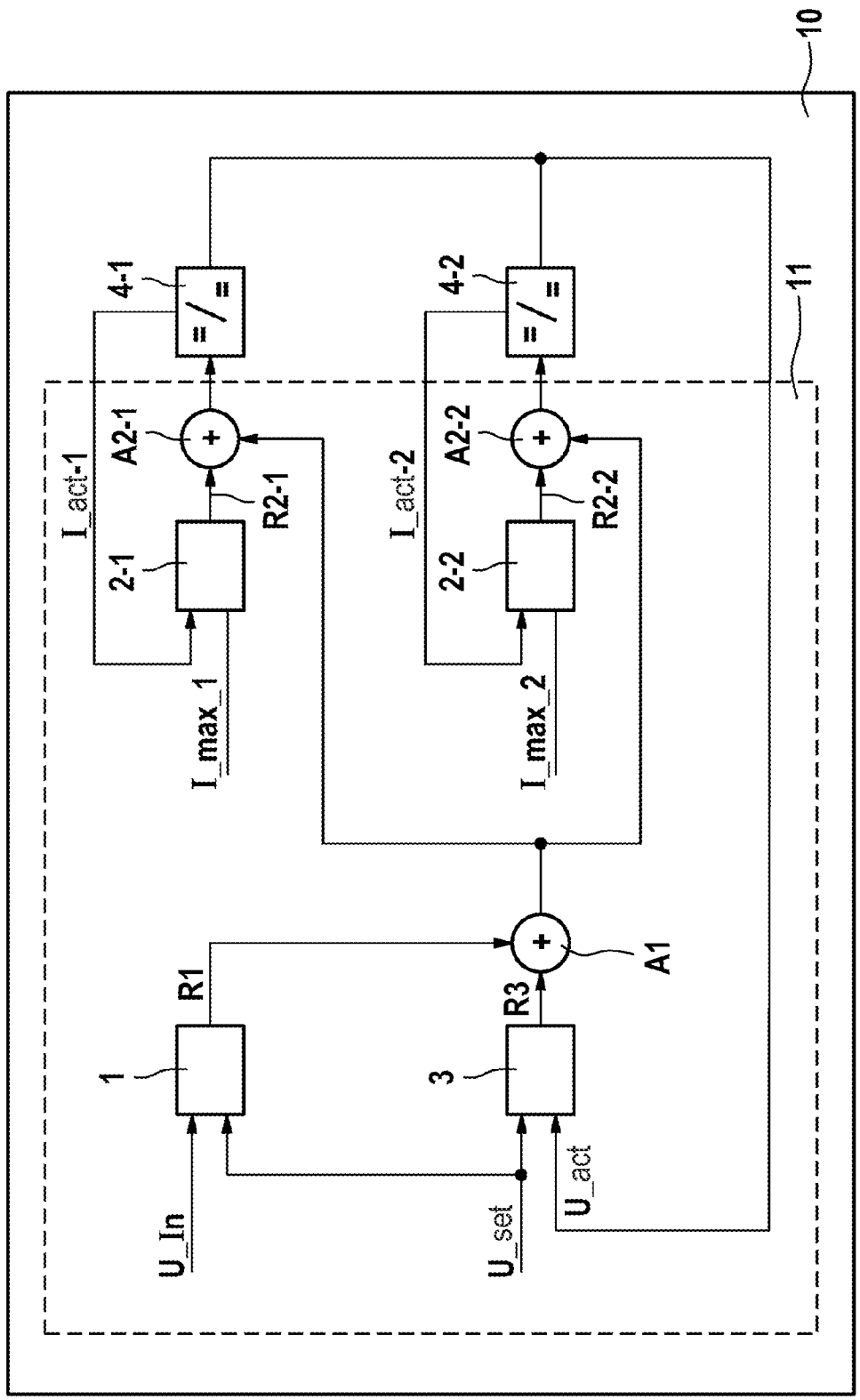
FIG. 1: shows a schematic illustration of a basic circuit diagram of a DC-DC voltage converter comprising a control device in accordance with one embodiment.

FIG. 1 shows a schematic illustration of a basic circuit diagram of a DC-DC voltage converter 10 comprising a control device 11 in accordance with one embodiment. The DC-DC voltage converter 10 comprises a plurality of DC-DC voltage converter modules 4-$i$. Although only two DC-DC voltage converter modules 4-1 and 4-2 are illustrated in the exemplary embodiment illustrated, the DC-DC voltage converter 10 can comprise any number of DC-DC voltage converter modules 4-$i$. Each DC-DC voltage converter module 4-$i$ can be fed with a DC voltage on the input side. The DC-DC voltage converter modules 4-$i$ convert the DC voltage provided on the input side to a further DC voltage and provide the converted DC voltage at the output. In this case, all of the DC-DC voltage converter modules 4-$i$ should provide a DC voltage with a similar level at the output side.

The output voltage of the DC-DC voltage converter modules 4-$i$ is controlled in accordance with a controlled variable. To this end, an individual controlled variable can be provided at each DC-DC voltage converter module 4-$i$. The controlled variables are generated by means of a control device 11. The construction and the functional principle of said control device 11 is explained in more detail in the following text.

The control device 11 comprises a central feedforward control device 1. Furthermore, the control device 11 comprises a corresponding current controller 2-$i$ for each DC-DC voltage converter module 4-$i$. Optionally, the control device 11 can furthermore comprise a central voltage controller 3. The DC-DC voltage converter modules 4-$i$ are accordingly controlled based on a central first controlled variable R1 from the feedforward control device 1, where necessary in combination with a further controlled variable R3 from the central voltage controller 3, and respective individual controlled variables R2-$i$ of the current controllers 2-$i$. This control concept is explained in more detail in the following text.

In addition to the setpoint value U_set for the output voltage of the DC-DC voltage converter 10, a variable U_in can be provided at the feedforward control device 1, said variable corresponding to an input voltage of the DC-DC voltage converter 10. In other words, the variable U_in corresponds to a voltage value at the inputs of the DC-DC voltage converter modules 4-$i$. Where necessary, still further variables, such as for example the values of the input or output currents of the DC-DC voltage converter modules 4-$i$ or similar, can be provided at the feedforward control device 1. The feedforward control device 1 determines the first controlled variable R1 based on the input values of the feedforward control device 1.

A variable U_set for a setpoint value of the output voltage of the DC-DC voltage converter 10 is provided at the central voltage controller 3. Furthermore, the voltage controller 3 receives a variable U_act, which corresponds to the present output voltage of the DC-DC voltage converter 10. The voltage controller 3 generates a further controlled variable R3 based on these two variables U_set and U_act.

The first controlled variable R1 and the further controlled variable R3 can be combined for example by means of a summing element A1 to form a joint controlled variable.

As already stated above, the control device 11 comprises an individual current controller 2-$i$ for each DC-DC voltage converter module 4-$i$. A variable I_act-i, which corresponds to a current of the corresponding DC-DC voltage converter module 4-$i$, is provided at each current controller 2-$i$. By way of example, the variable I_act-i can correspond to an output current from the respective DC-DC voltage converter module 4-$i$. As an alternative, it is also possible to detect an input current into the DC-DC voltage converter module 4-$i$ and to provide a corresponding variable at the respective current controller 2-$i$. Likewise, in principle other variables, which correspond to an electric current into or from the respective DC-DC voltage converter module 4-$i$, can also be provided at the respective current controller 2-$i$. Furthermore, a setpoint variable, in particular a maximum permissible current I_max-i can be provided at the current controllers 2-$i$. The respective current controller 2-$i$ generates a second controlled variable R2-$i$ from the variables I_act-i for the electric current in the respective DC-DC voltage converter module 4-$i$ and the setpoint value I_max-i. Said controlled variable R2-$i$ can be combined with the first controlled variable R1 from the feedforward control device and where necessary the further controlled variable R3 from the voltage control. By way of example, the controlled variables R1, R3 can be combined with the respective second controlled variables R2-$i$ in a respective further summing element A2-$i$. The combination of the controlled variables can subsequently be provided to the respective DC-DC voltage converter 4-$i$.

In this way, it is possible that, by means of the second controlled variable R2-$i$ from the respective current controllers 2-$i$, the first controlled variable R1 or the combination of the first controlled variable R1 and the further controlled variable R3 is overloaded by the second controlled variable R2-$i$ from the current controller 2-$i$. As a result, the maximum current in the respective DC-DC voltage converter module 4-$i$ or from the respective DC-DC voltage converter module 4-$i$ can be limited.

If the electric current in the respective DC-DC voltage converter module 4-$i$ or the electric current from the DC-DC converter module 4-$i$ is below the maximum current I_max-i, the respective second controlled variable R2-$i$ tends to zero. In this case, the first controlled variable R1 or the combination of the first controlled variable R1 and the further controlled variable R3 is not influenced by the respective second controlled variable R2-$i$. The control in the output voltage U is therefore carried out purely by the first controlled variable R1 of the feedforward control device 1, where necessary in combination with the further controlled variable R3 of the voltage controller 3, provided electric current of the respective DC-DC voltage converter module 4-$i$ is below the maximum current I_max.

The voltage controller 3 may be for example a two-point controller. In particular, the voltage controller 3 may be an I controller, that is to say a controller with a purely integrative control behavior without a P component or the like. The voltage controller 3 can be operated for example at two operating points. At a first operating point, the voltage controller 3 can output a controlled variable R3, which is suitable for permitting a flow of current into the DC-DC voltage converter modules 4-$i$. At a second operating point, the voltage controller 3 can output a controlled variable R3, which is suitable for deactivating a flow of current into the DC-DC voltage converter modules 4-$i$. To this end, for example, the value of the first controlled variable R3 can be reduced to the extent that the DC-DC voltage converter modules 4-$i$ subsequently do not output an electric current. In particular, the voltage controller 3 can be operated at the first operating point if or provided that the output voltage of the DC-DC voltage converter 10 is below a prescribed threshold value. That is to say that the controlled variable R3 output by the voltage controller 3 permits a flow of current in the DC-DC voltage converter modules 4-$i$ until the prescribed threshold value is reached at the output of the DC-DC voltage converter 10. If the output voltage of the DC-DC voltage converter 10 exceeds the prescribed threshold value, the voltage controller 3 can change to the second operating point. The further controlled variable R3 of the voltage controller 3 is subsequently decreased to the extent that it does not bring about a flow of current in the DC-DC voltage converter modules 4-$i$. If the voltage at the output of the DC-DC voltage converter 10 continues to decrease below a further threshold value, the voltage controller 3 can subsequently pass back to the first operating point. The further threshold value lies below the previously indicated threshold value by a hysteresis or an offset. As a result, an approximately constant voltage can be maintained at the output of the DC-DC voltage converter 10 in a simple manner.

The behavior of the voltage controller is explained again in detail in the following text. The voltage controller 3 can for example only be active when not all of the current controllers 2-$i$ of the DC-DC voltage converter modules 4-$i$ are active at the same time. As already stated above, the voltage controller 3 can have a pure I component (that is to say no P or PI components). The I component can be limited in particular in terms of maximum value and minimum value. The voltage controller 3 can assume negative or positive values. The voltage controller 3 can become negative by the magnitude of the value of the first controlled variable R1 of the feedforward control device 1. If, for example, the value R1 of the feedforward control device 1 is 0.7 (70%), the further controlled variable R3 cannot be lower than (−0.7). The maximum value of the further controlled variable R3 of the voltage controller 3 can for example assume the maximum duty cycle minus the duty cycle of the feedforward control device 1. If, for example, the maximum duty cycle is 0.93 (93%) and the first controlled variable R1 of the feedforward control device 1 is 0.7 (70%), the maximum value of the further controlled variable R3 of the voltage controller 3 is 0.93−0.7=0.23 (23%).

Provided that the voltage controller 3 is operated at its first operating point, it integrates the control deviation (setpoint voltage−actual voltage) and multiplies this result by a factor. After the output voltage exceeds a threshold value, the voltage controller 3 changes to the second operating point. The voltage controller 3 subsequently outputs a further controlled variable R3, which results from the negative first controlled variable R1 of the feedforward control device 1 multiplied by a further factor. If, for example, the first controlled variable R1 is 0.7, with the further factor of 0.9, the result is a controlled variable of −0.7*0.9=−0.63. A negative controlled variable in this case means that the total duty cycle is so low that no current can flow and therefore the voltage at the output remains the same.

When the voltage at the output falls below a further threshold value (for example first threshold value minus hysteresis), the voltage controller 3 can change back to the first operating process and therefore current can flow again out of the voltage converter modules 4-$i$. In this way, the voltage at the output of the DC-DC voltage converter 10 can be stabilized.

Figure 2:
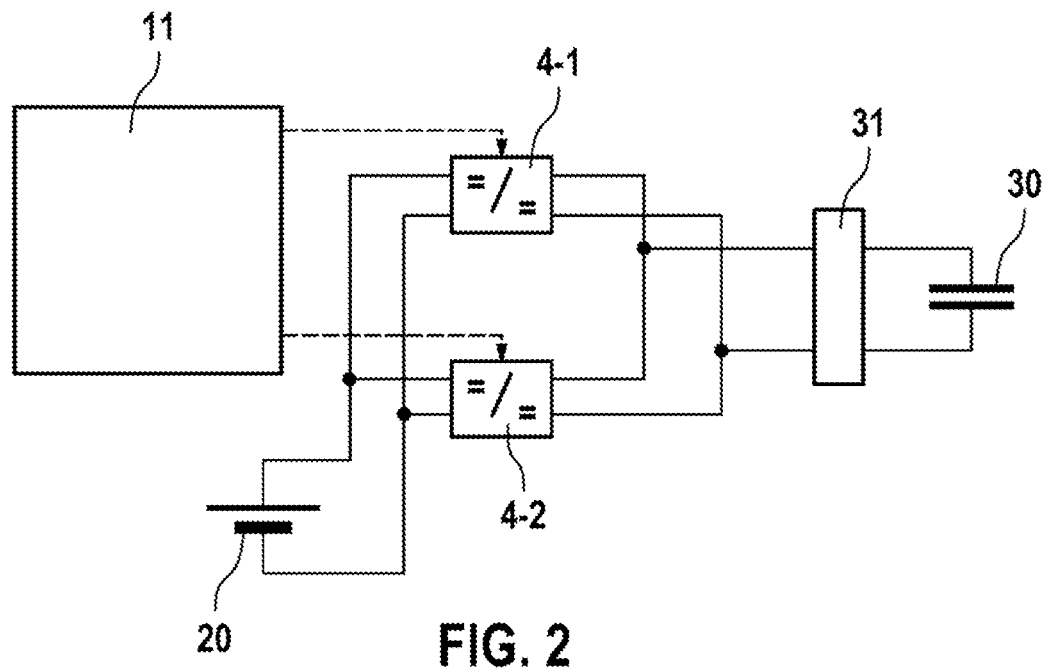
FIG. 2: shows a schematic illustration of a circuit arrangement comprising a DC-DC voltage converter in accordance with one embodiment.

FIG. 2 shows a schematic illustration of a circuit arrangement comprising a DC-DC voltage converter 10 in accordance with one embodiment. In this case, the DC-DC voltage converter 10 corresponds substantially to the previously described embodiment, and therefore all of the previous statements apply in the following text.

As can be seen in FIG. 2, the DC-DC voltage converter modules 4-$i$ of the DC-DC voltage converter 10 can be fed for example from a DC voltage source 20, such as for example a battery. For example, the battery 20 may be a battery in a low-voltage network of a vehicle, in particular an electric or hybrid vehicle. The DC-DC voltage converter 10 can be connected for example on the output side to a capacitor 30. The capacitor 30 may be for example a link circuit capacitor of a power converter. By way of example, the power converter comprising the link circuit capacitor 30 may be a power converter for an electric drive of an electric or hybrid vehicle. The link circuit capacitor 30 can be coupled for example to the output terminals of the DC-DC voltage converter modules 4-$i$ via a suitable isolating switch 31. In this way, a discharged capacitor 30 can be charged to a prescribed voltage by the DC voltage source 20 by means of the DC-DC voltage converter 10. If the DC-DC voltage converter modules 4-$i$ were to be actuated in accordance with the first controlled variable R1 from the feedforward control device 1 in such a way that, immediately at the beginning of the charging process, the setpoint voltage U_set to be achieved were applied to the outputs of the DC-DC voltage converter modules 4-$i$, the DC-DC voltage converter modules 4-$i$ would be loaded with very high electric currents. In order to prevent disproportionately high loading of the DC-DC voltage converter modules 4-$i$ at the beginning of the charging process, the respective current controllers 2-$i$ can influence the first controlled variable R1 or the combination of the first controlled variable R1 and the further controlled variable R3 by means of the second controlled variables R2-$i$. In this way, each DC-DC voltage converter module 4-$i$ can be actuated in such a way that first of all the output power from the DC-DC voltage converter modules 4-$i$ is limited in such a way that a maximum permissible current I_max-$i$ is not exceeded. If the voltage across the capacitor 30 approaches the setpoint voltage U_set to be achieved in the course of the charging process, the charging current in the capacitor 30 in this case decreases during the charging operation. After the charging current from a DC-DC voltage converter module 4-$i$ in the capacitor 30 falls below the maximum current I_max-$i$, the second controlled variable R2-$i$ of the respective current controller 2-$i$ approaches the value of zero, with the result that the controlled variable is not further influenced by the respective second controlled variable R2-$i$. Where necessary, the respective current controller 2-$i$ can subsequently be deactivated. After the capacitor has been charged to the prescribed setpoint voltage U_set, trickle charging can be provided by the DC-DC voltage converter 10. To this end, the limitation on the output current by the current controllers 2-$i$ can be dispensed with.

The DC-DC voltage converter modules 4-$i$ may be any desired DC-DC voltage converter modules. By way of example, the DC-DC voltage converter modules 4-$i$ can be configured as boost converters or buck converters. Furthermore, the DC-DC voltage converter modules 4-$i$ may also be combined buck-boost converters. In this case, the respective operating mode, that is to say the boost converter mode or buck converter mode, can also be taken into account for the actuation of the respective DC-DC voltage converter modules 4-$i$. In particular, a transition from a buck converter mode to a boost converter mode (or when necessary also in the reverse direction) can also be taken into account.

Furthermore, the DC-DC voltage converter modules 4-$i$ can also comprise a transformer. In this case, where necessary, the transformation ratio of the respective transformer can also be taken into account in the control, in particular in the generation of the respective controlled variable. For example, the transformation ratio of the transformer can be taken into account in the generation of the further controlled variable R3 in the feedforward control device.

Figure 3:
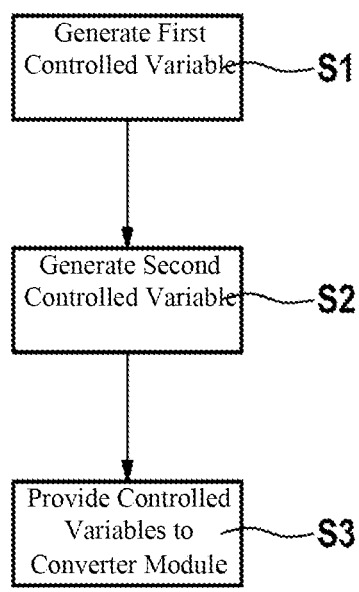
FIG. 3: shows a flowchart on which a method for controlling a DC-DC voltage converter in accordance with one embodiment is based.

FIG. 3 shows a schematic illustration of a flowchart as is the basis for a method for controlling a DC-DC voltage converter 10 in accordance with one embodiment. The DC-DC voltage converter 10 may be in particular a previously described DC-DC voltage converter 10. The previously described DC-DC voltage converter 10 can accordingly also execute all of the method steps that are described below. In an analogous manner, the method described below also comprise all of the steps that have been described above in connection with the DC-DC voltage converter 10.

In a step S1, a first controlled variable R1 is generated. The first controlled variable R1 can be generated in particular using a setpoint value U_set for the output voltage U of the DC-DC voltage converter 10 and a determined value U_In of the input voltage U of the DC-DC voltage converter 10. In a step S2, a plurality of individual second controlled variables R2-$i$ can be generated. In particular, a separate second controlled variable R2-$i$ can be generated for each DC-DC voltage converter module 4-$i$. The second controlled variable R2-$i$ can be influenced at the beginning of the charging process depending on the first controlled variable R1 for example by initialization of the current controller 2-$i$. The respective second controlled variables R2-$i$ can be generated using a determined value I_act-$i$ for the current in the respectively assigned DC-DC voltage converter module 4-$i$ and a predetermined maximum current I_max-$i$ for the respective DC-DC voltage converter module 4-$i$. In a step S3, the first controlled variable R1 and the respective second controlled variable R2-$i$ for the respectively assigned DC-DC voltage converter module 4-$i$ can be combined. The combined controlled variable can subsequently be provided to the respective DC-DC voltage converter module 4-$i$.

In summary, the present invention relates to the control of a DC-DC voltage converter comprising a plurality of DC-DC voltage converter modules. To this end, a central controlled variable for voltage-controlled control of the DC-DC voltage converter is generated for all of the DC-DC voltage converter modules. Furthermore, a current-based controlled variable can additionally be generated for each DC-DC voltage converter module. By combining the voltage-based controlled variable and the current-based controlled variable, the output power, in particular the output current, of each DC-DC voltage converter module can be adjusted individually. In this way, overloading of the DC-DC voltage converter modules can be prevented.

The invention claimed is:

1. A control device (11) for a DC-DC voltage converter (10) comprising a plurality of DC-DC voltage converter modules (4-$i$), the control device (11) comprising:
a feedforward control device (1), which is designed to generate a first controlled variable (R1) using a setpoint value (U_set) for an output voltage of the DC-DC voltage converter (10) and a determined value (U_In) of an input voltage of the DC-DC voltage converter (10),
a plurality of current controllers (2-$i$), wherein each DC-DC voltage converter module (4-$i$) is assigned a current controller (2-$i$), wherein the plurality of current controllers (2-$i$) are each designed to generate an individual second controlled variable (R2-$i$) for the respectively assigned DC-DC voltage converter module (4-$i$), and wherein the plurality of current controllers (2-$i$) are each designed to determine the respective second controlled variable (R2-$i$) using a determined value (I_act-$i$) for a current in the respectively assigned DC-DC voltage converter module (4-$i$) and a predetermined maximum current (I_max-$i$) for the respective DC-DC voltage converter module (4-$i$), and
a voltage controller (3), which is designed to generate a third controlled variable (R3) using the setpoint value (U_set) for the output voltage of the DC-DC voltage converter (10) and a determined value (U_act) of the output voltage of the DC-DC voltage converter (10);
wherein the voltage controller (3) comprises a two-point controller, which is designed at a first operating point, to output the third controlled variable (R3), which is suitable for permitting a flow of current in the plurality of DC-DC voltage converter modules (4-$i$) when the determined value (U_act) of the output voltage of the DC-DC voltage converter (10) falls below a prescribed first threshold value and, at a second operating point, to output the third controlled variable (R3), which is suitable for deactivating the flow of current in the plurality of DC-DC voltage converter modules (4-$i$) when the determined value (U_act) of the output voltage of the DC-DC voltage converter (10) exceeds a prescribed second threshold value, wherein the third controlled variable (R3) is combined with the first controlled variable (R1) to form a joint controlled variable (R1, R3); and
wherein the voltage controller (3) generates the third controlled variable by integrating a result of a control deviation and multiplying the result by a factor, and wherein the voltage controller (3) is an integral controller with an integrative control behavior and without a proportional (P) component.

2. The control device (11) as claimed in claim 1, wherein the plurality of current controllers (2-$i$) are each designed to limit an output current (I_act-$i$) of the respectively assigned DC-DC voltage converter modules (4-$i$) to the predetermined maximum current (I_max-$i$).

3. The control device (11) as claimed in claim 1, wherein the control device (11) is designed to deactivate the current controllers (2-$i$) when a predetermined output voltage (U_act) is reached at the output of the DC-DC voltage converter (10).

4. A DC-DC voltage converter (10), comprising:
a plurality of DC-DC voltage converter modules (4-$i$), which are each designed to convert a DC input voltage to a DC output voltage; and
a control device (11) as claimed in claim 1, wherein a separate current controller (2-$i$) is provided in the control device (11) for each DC-DC voltage converter module (4-$i$) in the DC-DC voltage converter (10).

5. The DC-DC voltage converter (10) as claimed in claim 4, wherein the DC-DC voltage converter (10) is designed to be coupled, via an isolating switch, at an output to a capacitor (30), wherein the capacitor (30) includes a link circuit capacitor.

6. A method for controlling a DC-DC voltage converter (10) comprising a plurality of DC-DC voltage converter modules (4-$i$), the method comprising the following steps:
generating (S1) a first controlled variable (R1) using a setpoint value (U_set) for an output voltage of the DC-DC voltage converter (10) and a determined value (U_in) of an input voltage of the DC-DC voltage converter (10), wherein the first controlled variable (R1) is combined with a third controlled variable (R3) to form a joint controlled variable, wherein the third controlled variable (R3) is generated by a two-point controller of a voltage controller (3) using the setpoint value (U_set) for the output voltage of the DC-DC voltage converter (10) and a determined value (U_act) of the output voltage of the DC-DC voltage converter (10), and wherein the voltage controller (3) generates the third controlled variable by integrating a result of a control deviation and multiplying the result by a factor, and wherein the voltage controller (3) is an integral controller with an integrative control behavior and without a proportional (P) component;
generating (S2) a plurality of individual second controlled variables (R2-$i$) for the plurality of DC-DC voltage converter modules (4-$i$), wherein each second controlled variable (R2-$i$) is generated using a determined value (I_act-$i$) for a current in the respectively assigned DC-DC voltage converter module (4-$i$) and a predetermined maximum current (I_max-$i$) for the respective DC-DC voltage converter module (4-$i$); and
combining (S3) the joint controlled variable (R1, R3) and the second controlled variable (R2-$i$) for the respectively assigned DC-DC voltage converter module (4-$i$) and providing the respective combined controlled variables to the corresponding DC-DC voltage converter modules (4-$i$).

7. The control device (11) as claimed in claim 1, wherein at the first operating point the voltage controller (3) generates the third controlled variable (R3) by integrating a result of a control deviation and multiplying the result by a factor, wherein the control deviation is a difference of the setpoint value (U_set) and the determined value (U_act).

8. The control device (11) as claimed in claim 1, wherein the two-point controller is an integrative (I) controller is configured to integrate a result of a control deviation.

9. The control device (11) as claimed in claim 1, wherein at the first operating point the voltage controller (3) generates the third controlled variable (R3) by integrating a result of a control deviation.

10. The control device (11) as claimed in claim 1, wherein the control deviation is a difference between the setpoint voltage (U_set) and the determined value (U_act).

11. The control device (11) as claimed in claim 8, wherein the integrative (I) controller includes integrative control behavior and is without a proportional (P) component.

12. The control device (11) as claimed in claim 8, wherein the control deviation is a difference between the setpoint voltage (U_set) and the determined value (U_act).

* * * * *